(12) United States Patent
O'Grady et al.

(10) Patent No.: US 8,852,012 B2
(45) Date of Patent: Oct. 7, 2014

(54) STORAGE AT INDOOR GOLF DRIVING RANGE

(71) Applicants: Brendan O'Grady, Ada, MI (US); Sam S. Han, Beavercreek, OH (US)

(72) Inventors: Brendan O'Grady, Ada, MI (US); Sam S. Han, Beavercreek, OH (US)

( * ) Notice: Subject to any disclaimer, the term of this patent is extended or adjusted under 35 U.S.C. 154(b) by 42 days.

(21) Appl. No.: 13/659,864

(22) Filed: Oct. 24, 2012

(65) Prior Publication Data

US 2013/0109485 A1    May 2, 2013

Related U.S. Application Data

(60) Provisional application No. 61/551,430, filed on Oct. 26, 2011.

(51) Int. Cl.
*A63B 57/00* (2006.01)
*A63B 69/36* (2006.01)

(52) U.S. Cl.
USPC ............................ 473/132; 473/133; 473/136

(58) Field of Classification Search
USPC .......................................... 473/132, 133, 136
See application file for complete search history.

(56) References Cited

U.S. PATENT DOCUMENTS

| 4,629,202 A | * | 12/1986 | Nelson et al. | ............... 280/47.26 |
| 2007/0096415 A1 | * | 5/2007 | Reimers | ................... 280/47.131 |

FOREIGN PATENT DOCUMENTS

KR    20100066329    *    6/2010    .............    A63B 69/36

\* cited by examiner

*Primary Examiner* — William M. Brewster
(74) *Attorney, Agent, or Firm* — Sam Han

(57) ABSTRACT

Systems and methods are disclosed for providing storage at indoor golf driving ranges. In various embodiments, the disclosed systems and methods permit golfers to store their baggage in close proximity to the golfers while the golfers practice their swing.

6 Claims, 10 Drawing Sheets

US 8,852,012 B2

STORAGE AT INDOOR GOLF DRIVING RANGE

CROSS REFERENCE TO RELATED APPLICATIONS

This application claims the benefit of U.S. provisional patent application Ser. No. 61/551,430, filed 2011 Oct. 26, having the title "Storage at Indoor Golf Driving Range," by Han and O'Grady, which is incorporated herein by reference in its entirety.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION BY REFERENCE OF MATERIAL SUBMITTED ON A COMPACT DISC

Not Applicable

BACKGROUND

1. Field of the Disclosure

The present disclosure relates generally to golf driving ranges, and more particularly to storage systems and methods at indoor driving ranges.

2. Description of Related Art

Many golfers practice their swings at driving ranges. Indoor driving ranges allow for golfers to practice their swings when it is not practical to practice outdoors. These indoor driving ranges are often limited in space.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1A:
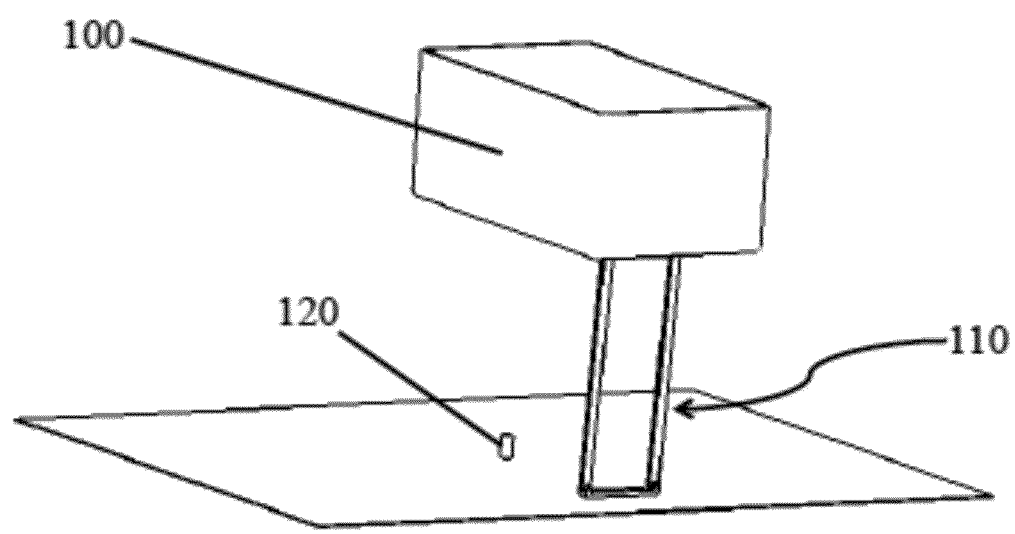
FIG. 1A shows a first embodiment for a storage system for a golf driving range with a storage bin in a starting position

Many golfers practice their swings at driving ranges. An indoor driving range allows a golfer to practice his golf-swing when it is not practical to practice outdoors, such as during inclement weather. These indoor driving ranges are often limited in space. Thus, the golfer frequently leaves his belongings or baggage (e.g., briefcase, computer bag, suitcase, other luggage, etc.) in his car or elsewhere, rather than bringing those belongings into the indoor driving ranges.

In the event that the golfer brings baggage to the indoor driving range, the golfer must leave the baggage in a location that is sufficiently far from the golfer so that the baggage does not interfere with the golfer's swing. In short, the baggage should be placed in a location that is sufficiently far from the golfer that a golf club, during its swing, would not make contact with the baggage.

For typical golfers, this is a distance that is greater than about two (2) meters from the golfer, since the golfer's reach is determined by the length of his arm in conjunction with the length of a golf club. Additionally, the baggage should be placed sufficiently far from the golfer so that it does not psychologically interfere with the golf swing. In other words, if the baggage is too close, then the golfer's swing will be affected because of the golfer's paranoia that he will hit the bags, even though the baggage is in reality beyond the physical reach of the golf club. For this reason, the baggage is usually placed in a location that is quite some distance from the location where the golfer practices his swing.

Typical indoor golfing ranges, such as those associated with indoor sports complexes, often provide storage lockers within the facility to house baggage and other personal items, the golfer may bring inside with him. These storage lockers are usually provided in a central location in the indoor golfing range remote to the actual driving range. Suffice it to say that in a typical indoor golfing range, baggage or other personal items that the golfer may choose to store while practicing are stored in a remote location, usually out of sight of the golfer. In settings such as typical sports complexes or other entertainment venues, it is not critical to have the baggage or other personal items effectively unattended.

As a result, there currently exists no system to provide storage for golfers that wish or need to keep their baggage nearby while they practice their golf swing at indoor driving ranges. This is because providing a storage system in close proximity to where the golfer practices his swing will naturally interfere (both physically and psychologically) with the golfer's swing. Conversely, moving the baggage to a distance that is quite some distance from the golfer will result in the baggage being effectively unattended.

Those having skill in the art understand the difficulty of finding an adequate solution to this problem. This is because the degree of interference from the golfer's baggage is directly proportional to the proximity of the golfer to his baggage. In other words, as the baggage is moved closer to the golfer, the tendency of the baggage to interfere with the golfer's swing increases. Thus, conventional wisdom teaches that baggage should be placed in a location that is quite distant from the golfer. For this reason, even on traditional golf courses, the golf bags are either left in a golf cart, which is parked several meters away, or placed at a distance of several meters behind the golfer.

In view of this conventional wisdom, placing baggage in close proximity to a golfer would make it effectively impossible for the golfer to properly practice his swing. Thus, one having ordinary skill in the art will understand that it is not a trivial task to construct a storage system that is in close proximity to the location where the golfer will practice his swing.

The embodiments disclosed herein are directed to such storage systems that buck conventional wisdom and allow for a golfer to store his baggage in close proximity without the baggage interfering with the golfer practicing his swing. Having provided a general overview of the inventive concepts, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

In its broadest embodiment, the storage system is located within two (2) meters of a golfer, yet configured so as to avoid interfering with the golfer's swing. This allows the golfer to attend to his baggage while simultaneously practicing his golf swing. In a more preferred embodiment, the storage system is located within one (1) meter of the golfer, yet beyond the reach of the golfer's swing. Ideally, the storage system is located less than a half (½) meter from the golfer but, again, beyond the reach of the golfer's swing.

FIG. 1A shows a first embodiment for a storage system for a golf driving range with a storage bin 100 in a starting position. In this first embodiment, the storage system uses four (4) bars 110 to hold the bin 100 at or near ground level. One having ordinary skill will appreciate that depending on an area available to place the storage system the bars may be equal in length. Alternatively, two of the four bars 110 can have a first length and the remaining two bars can have a second length, the second length being less than the first length. An example of the latter configuration is depicted in FIG. 1.

Figure 1B:
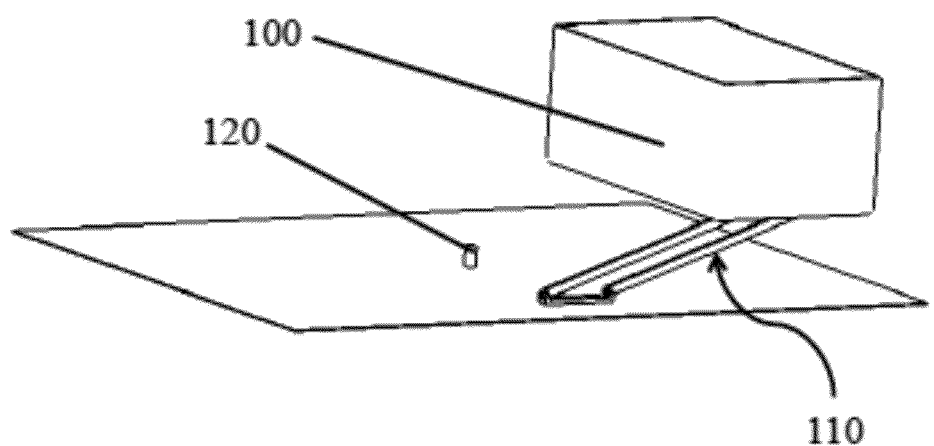
FIG. 1B shows the storage system of FIG. 1A with the bin moved to one side of a golf tee.

In operation, the four bars 110 allow for the golfer to place his baggage in the bin 120, as shown in FIG. 1A, and then move the bin 100 to one side of a golf tee 120, as shown in FIG. 1B, in order to practice his golf swing. To accommodate both left- and right-handed golfers, the bars 110 are coupled to the bin 100 such that the bin 100 can be moved to the right or the left of the golf tee 120. Once the bin is moved to one side or the other, a fastening mechanism, such as a latch or a magnet, hold the bin in place. When the golfer is finished practicing his swing, the mechanism can be released and the bin returns to the central starting position. One advantage of this embodiment is that the baggage can be securely stowed, i.e. locked, in the bin 120 while the golfer practices. Thus the golfer does not have to worry about his baggage being stolen while he practices, which adds to his peace of mind allowing for increased focus during practice. Additionally this embodiment is that the bin 120 is at or near ground level. However, this embodiment also has a disadvantage, since the bin at ground level is still visible to the golfer, thereby having the potential to psychologically affect the golfer's swing.

Figure 2A:
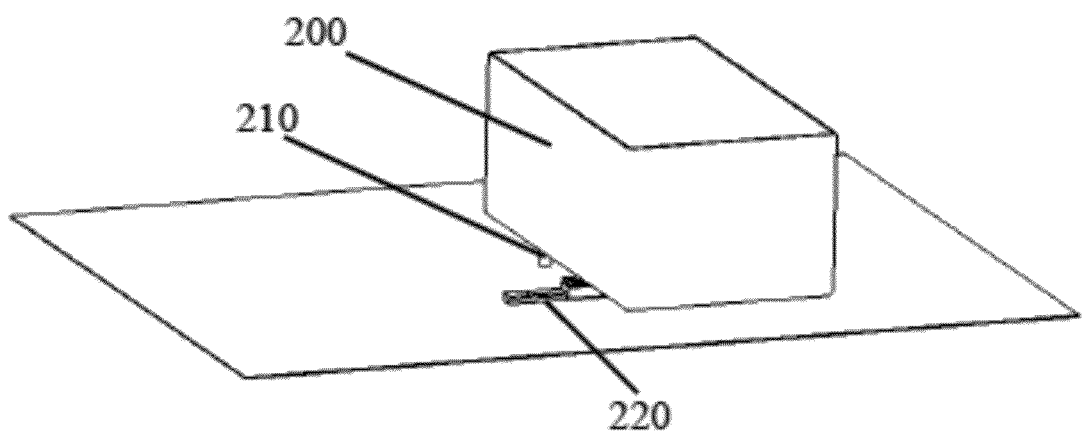
FIG. 2A shows a second embodiment for a storage system for a golf driving range with a storage bin in a starting position.
Figure 2B:
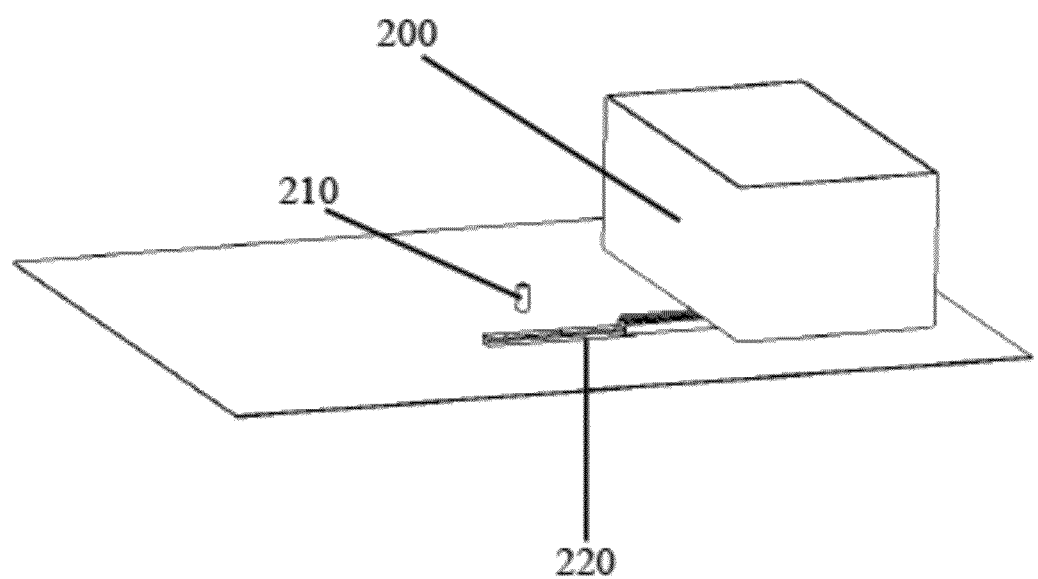
FIG. 2B shows the storage system of FIG. 2A with the bin moved to one side of a golf tee.

FIG. 2A shows a second embodiment for a storage system for a golf driving range with a storage bin in a starting position. Similar to the embodiments disclosed in relation to FIGS. 1A and 1B, the second embodiment keeps the bin 200 at or near ground level. In this second embodiment, the bin can be moved to one side of a golf tee 210, a shown in FIG. 2B, using a slider mechanism 220. The use of a slider mechanism allows the baggage to be moved out of the path of the golfer's swing with the simple nudge of a foot. One having ordinary skill in the art will appreciate that the slider mechanism 220 can be made of any type of hardware that can be affixed to a floor and permits the bin 200 to slide, aided by a user, along a fixed track. This embodiment has similar advantages to the embodiments disclosed in relation to FIGS. 1A and 1B. Similar to the embodiments disclosed in relation to FIGS. 1A and 1B, one disadvantage of the slider mechanism 200 is that the bin is highly visible to the golfer and, therefore, may hinder the golfer's swing.

Figure 3A:
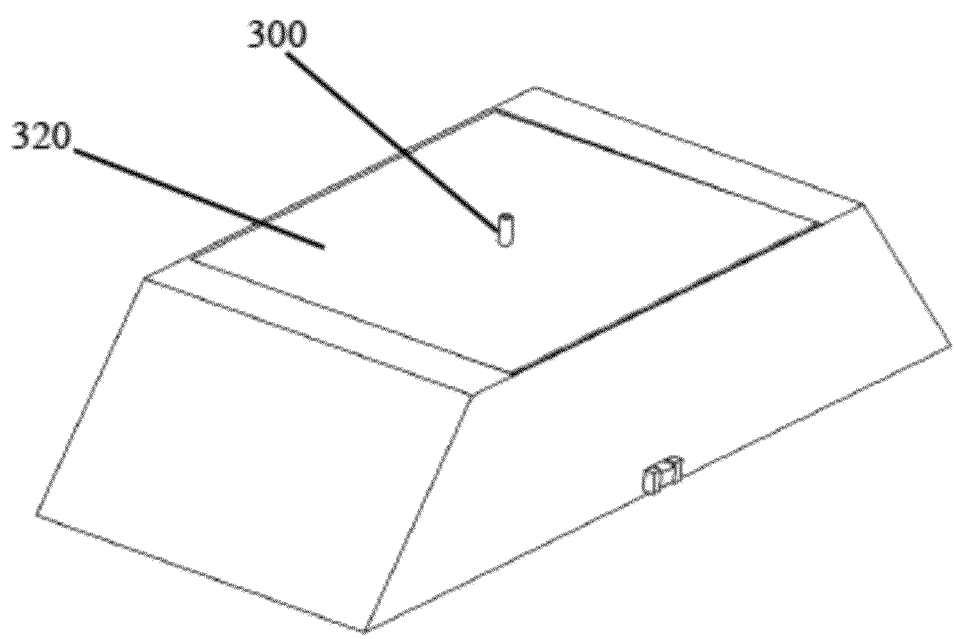
FIG. 3A shows a third embodiment for a storage system for a golf driving range with a storage bin in a closed configuration.
Figure 3B:
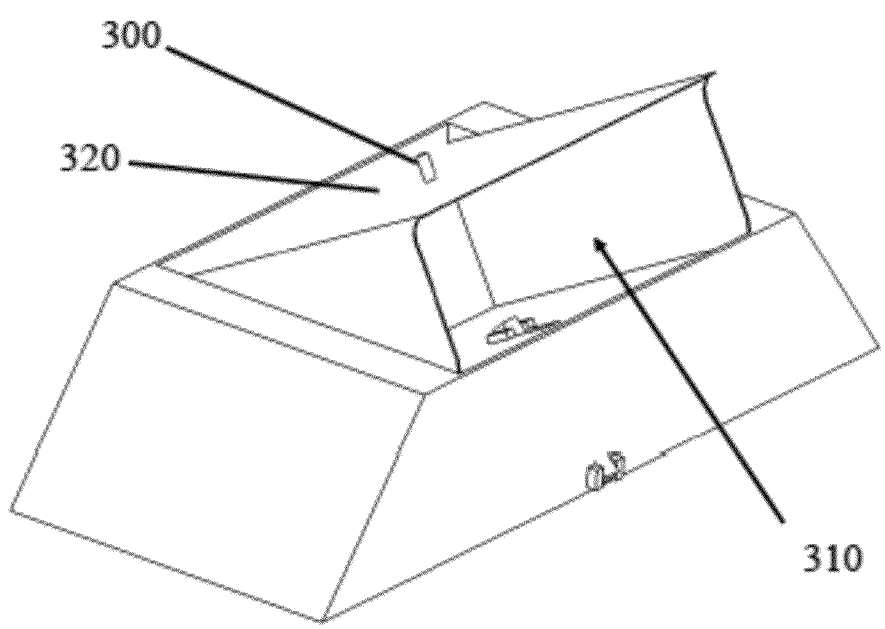
FIG. 3B shows the storage system of FIG. 3B with the storage bin in an open configuration.

Suffice it to say that while FIGS. 1A, 1B, 2A, and 2B may provide for a simple storage space, these are not the most preferred embodiments, since the possibility of interference still exists. With this in mind attention is turned to FIGS. 3A and 3B, which show a third embodiment for a storage system for a golf driving range with a storage bin in a closed configuration (FIG. 3A) and an open configuration (FIG. 3B). Unlike the embodiments described in relation to FIGS. 1A, 1B, 2A, and 2B, the embodiment of FIGS. 3A and 3B allows the golfer to store his baggage in a location that is completely beyond the reach of the golfer's swing, even though the luggage is physically located in very close proximity (in some embodiments less than a half meter) to the golfer. A distance to the golfer is measured as the distance of the baggage to a golf tee 300, as a golf ball will be placed on the tee 300 and the golf club will ideally make contact with the ball at the tee 300.

This third embodiment shows a storage bin 310 that is located below the golfer (or below the golf tee 300). By elevating a driving area 320, as shown in FIG. 3A, the bin 310 can be placed underneath the driving area 320, completely out of reach of the golfer. Access to the bin 310 is gained via a pop-up mechanism as shown in FIG. 3B. When activated, the bin 310, which is underneath the driving area 320, rotates about an axis exposing the storage bin 310. Once the golfer has stored his baggage, the bin can be closed by pushing downward on a surface until the driving area 320 is level and parallel to the ground, as shown in FIG. 3A. One having ordinary skill in the art can appreciate that opening of the bin 310 can be accomplished by a simple pressure activated release mechanism or any other suitable mechanism. This mechanism also holds the bin 310 closed so that when the golfer is standing on the driving area, the driving area does not flip up and knocks the golfer off the driving area. Stated differently, the mechanism also locks the driving area in place to prevent accidental opening of the bin 310.

The embodiments of FIGS. 3A and 3B is highly preferred, since the baggage is literally located at the golfer's feet, yet the baggage is physically and visibly out-of-reach of the golfer, thereby removing any interference with the golfer's swing. For many of these embodiments, the size of the storage space is similar to that of carry-on luggage for airlines. Thus, should one wish to operate an indoor golf driving range at an airport, this type of storage mechanism allows for travelers to store their carry-on bags in a location that does not interfere with their golf swing, yet is within the distance that is required by the Transportation Security Administration (TSA) regulations. Currently, the carry-on baggage size limit is a length of approximately 22 inches to approximately 24 inches, a width of approximately 13 inches to approximately 17 inches, and a height of approximately 8 inches to approximately 10 inches. However, as one can appreciate, these dimensions may be adjusted as needed.

Figure 4:
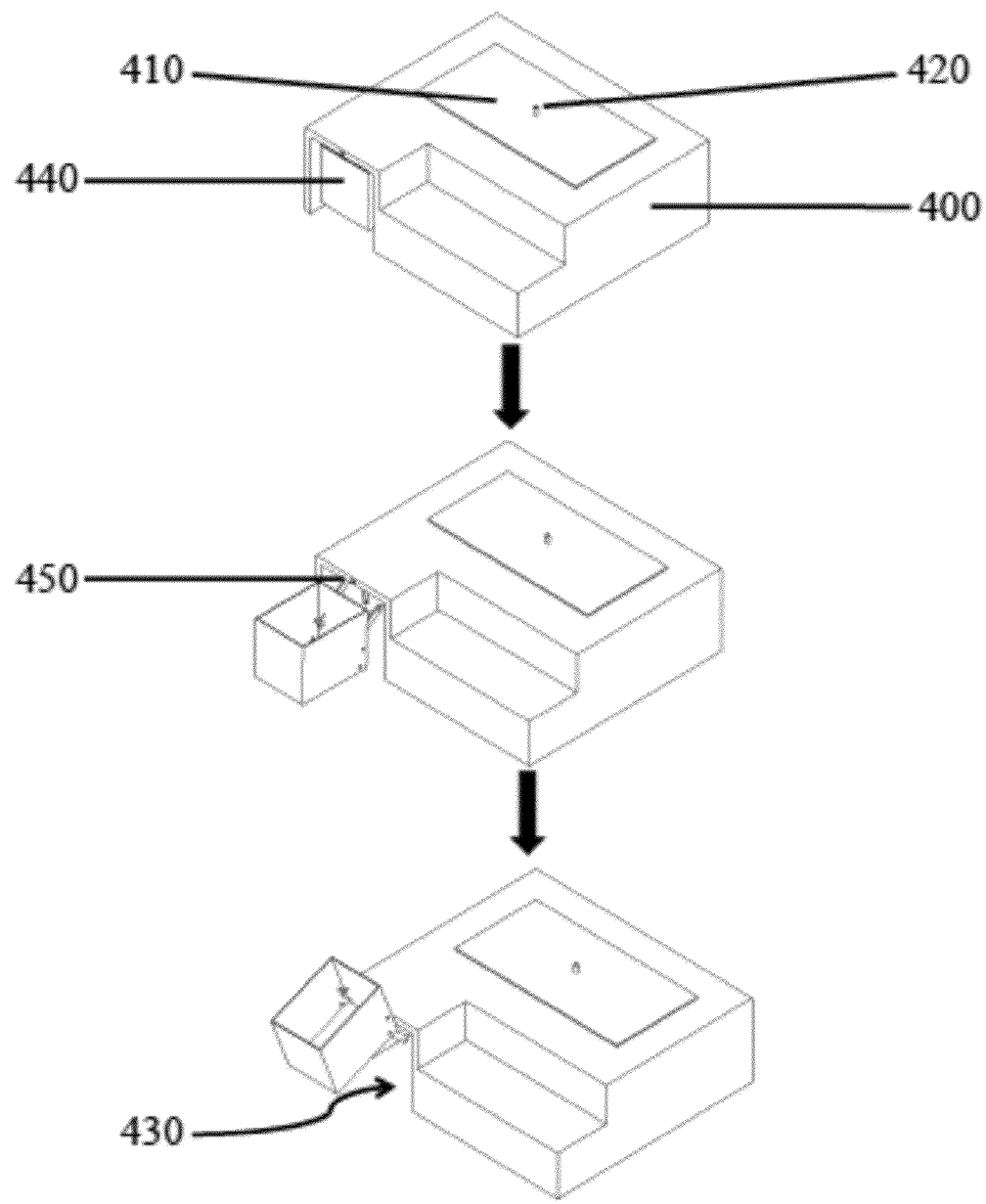
FIG. 4 shows a fourth embodiment of a storage system for a golf driving range that utilizes an elevated platform.

Turning now to FIG. 4, which shows a fourth embodiment of a storage system for a golf driving range that utilizes an elevated platform. Similar to the embodiment disclosed in relation to FIGS. 3A and 3B, the fourth embodiment permits the golfer to store his baggage underneath his feet. Thus, FIG. 4 is also a preferred embodiment.

As shown in FIG. 4, the golfer practices his swing from an elevated platform 400 that has a driving area 410 with a golf tee 420. The elevated platform 400 creates a space 430 underneath that is suitable for storing baggage. In the fourth concept, the baggage is again located below the tee at less than approximately one-half (½) meter (or fifty (50) centimeters (cm)) from the tee 420. In this embodiment, the storage system comprises a storage bin 440 that is located in the space 430 underneath the tee, and coupled to the underside of the platform 400 by either a four-bar mechanism 450 (similar to that shown in FIG. 1) or a slider mechanism (similar to that shown in FIG. 2). Unlike FIG. 1 or FIG. 2, the four-bar mechanism 450 or the slider mechanism is located below the surface so that the storage bin 440 is physically beyond the reach of the golf club and visibly removed from the golfer's sight, thereby removing all interference with the golfer's swing. For some embodiments, the bin 440 and associated mechanism may be omitted, allowing the baggage to be stored simply in the space underneath the driving area. The embodiments that omit the bin 440 are not well suited for use when it is desirable to lock up baggage.

Again for this embodiment, the size of the storage space can be similar to that of carry-on luggage for airlines. Thus, should one wish to operate an indoor golf driving range at an airport, this type of storage mechanism allows for travelers to store their carry-on bags in a location that does not interfere with their golf swing, yet is within the distance that is required by the Transportation Security Administration (TSA) and airport authorities.

Figure 5:
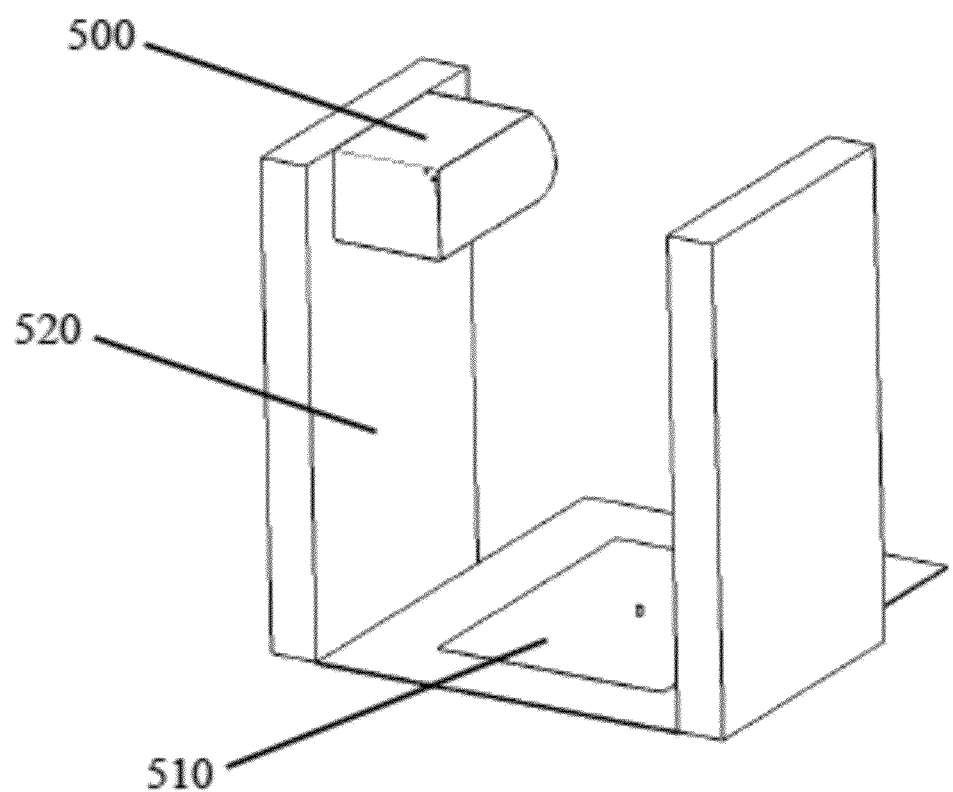
FIG. 5 shows a fifth embodiment for a storage system for a golf driving range with overhead baggage storage.

FIG. 5 shows a fifth embodiment for a storage system for a golf driving range with overhead baggage storage. Although not the most preferred embodiment, the fifth embodiment permits a golfer to store his baggage in an overhead-style bin 500, similar to that found in many airplanes. The bin 500 is supported over a driving area 510 by a suitable support structure. For example, the bin 500 may be placed on a wall or a partition that divides different driving areas. Thus, this embodiment has the advantage of creating privacy from adjoining driving areas, which may help to improve a golfer's focus and concentration.

However, the reason that this is not the most preferred embodiment is because the golfer's swing carries the head of the golf club above the golfer's head. In other words, the arcuate path of the golf-club head may be such that the golf-club head comes into close proximity with the storage bin. However, the interference from the overhead-style bin can be ameliorated by positioning the golfer so that he is facing the storage bin, since the golf-club head is in front of the golfer during the low part of the swing, but behind the golfer during the high part of the swing.

For some venues, a virtual driving range may be desirable. For example, if the driving range were located indoors where space is very limited, such as would be in an airport or similar setting, it is not practical to hit golf balls over large physical distances. However, in order to adequately practice and improve their swing, golfers still require some feedback as to how the ball was hit. Thus, a virtual system allows golfers to assess the performance of their swing, as given by a calculated and virtually displayed flight of a golf ball, without the need to actually hit a golf ball over long physical distances. As virtual driving ranges are known in the art, only a truncated discussion is provided herein. Typically, a golfer hits a ball from a tee in the direction of a screen that serves two main functions: (1) collect data about a golf ball trajectory; and (2) provide a virtual image of a golf hole or driving range to provide a setting for the golfer. As one can appreciate, all virtual driving ranges require some system and/or method to collect and process the data concerning the trajectory of the golf ball in order to create a virtual image of the flight path of the golf ball. Current virtual driving range systems use video cameras and triangulation to track the ball. These systems are complex and more expensive.

Figure 6:
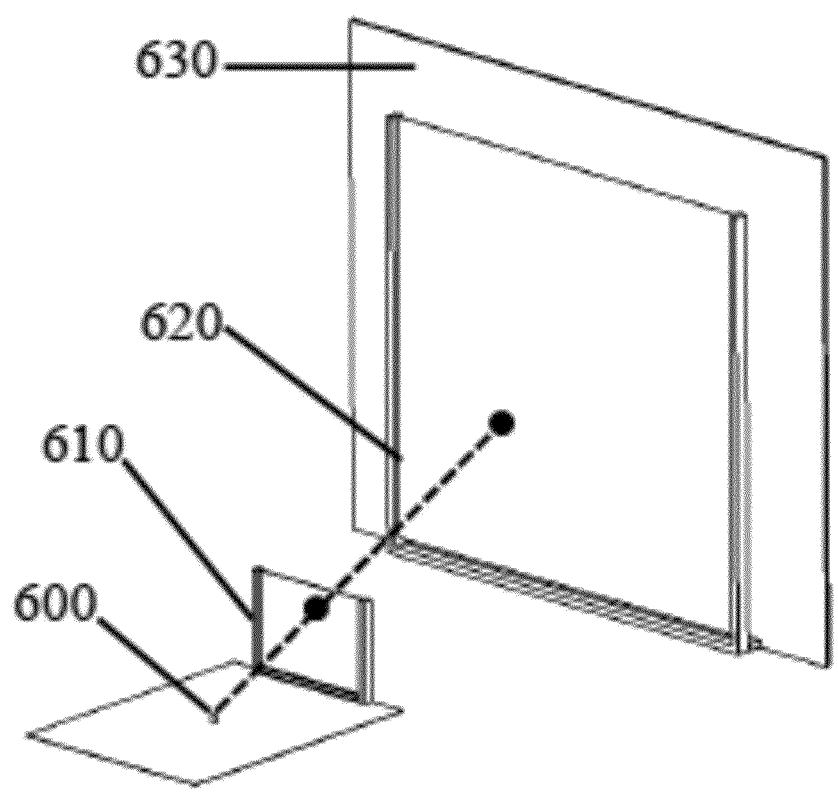
FIG. 6 shows a perspective view of one embodiment of a trajectory-calculating system for a virtual golf driving range.
Figure 7:
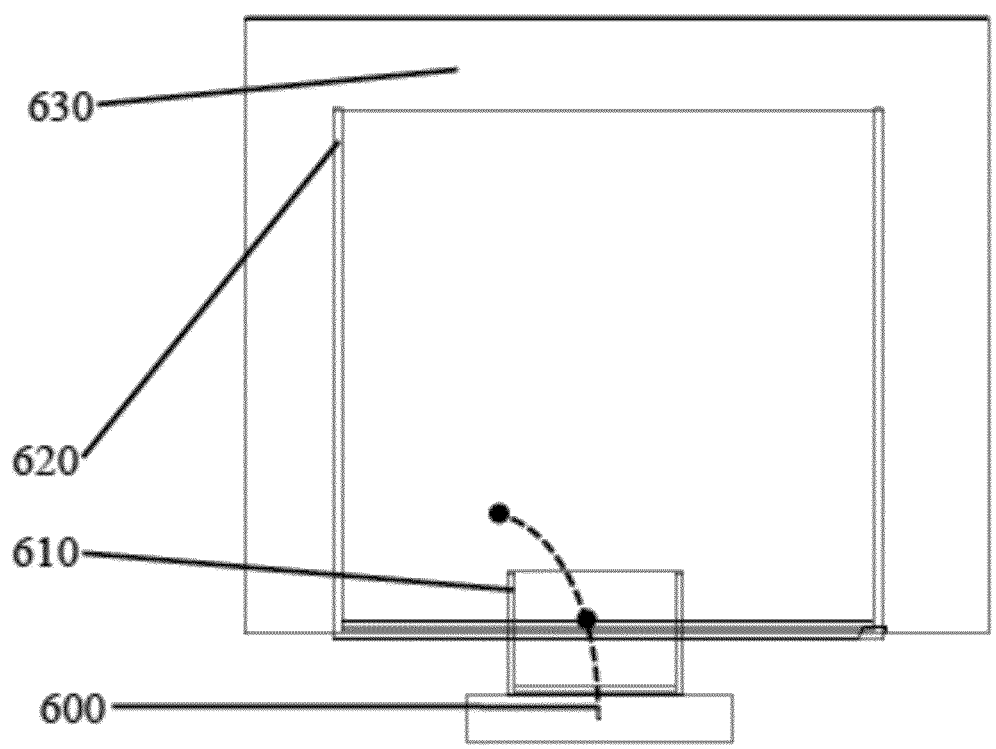
FIG. 7 shows a front view of the trajectory-calculating system of FIG. 6.

With this in mind, attention is turned to FIG. 6, which shows a perspective view of one embodiment of a novel trajectory-calculating system for a virtual golf driving range, and FIG. 7, which shows a front view of the trajectory-calculating system of FIG. 6. The use of a trajectory calculating system significantly reduces complexity and cost of the virtual driving range system. In its simplest form, a trajectory of a golf ball is calculated from a three (3) point measurement of the golf ball. These locations include: a location of a golf tee (where the golf ball originates) 600; a location of the golf ball in mid-flight (as measured by a first set of sensors) 610; and a location of the golf ball when it hits a back screen or net 630 (as measured by a second set of sensors 620).

For the trajectory-calculating system, the mid-flight measurement is detected by the first set of sensors 610 that preferably measure the ball's vertical and horizontal position in a first measuring plane in space. The first measuring plain is placed up to approximately 12 feet, preferably 4-8 feet from a golf tee, so the first set of sensors do not distract the golfer. A back-screen measurement is also detected by the second set of sensors 620 that measure the vertical and horizontal position of the ball in a second measuring plane as it hits the back screen. In other words, the second measuring plane is right at the screen 630. Preferably the screen 630 and the second set of sensors 620 are placed approximately 15 feet to approximately 20 feet from the golf tee 600, however, the screen 630 can be placed at any suitable distance from the golf tee 600. The exact location of the first set of sensors 610 and the second set of sensors 620 depends primarily on physical space available for the indoor driving range embodiments disclosed herein.

In operation, the first set of sensors 610 are configured and placed such that the initial trajectory of the ball can be calculated from the positional measurements collected by the first set of sensors 610, using the golf tee 600 as a reference point. The positional measurements collected by the second set of sensors 620 are compared with the positional measurements and trajectory calculations from the first set of sensors to determine ball spin and flight path. Ball speed can be calculated by measuring the time between when the ball passes through the first set of sensors 610 and when it passes through the second set of sensors 620. Alternatively, ball speed can be measured by calculating the time between when the ball leaves the tee 600 and when it passes the first set of sensors 610. For these embodiments, a third sensor can be coupled to the tee 600 to measure when the ball leaves the tee 600.

Once the three positions are known, a near-real-time fit of the ball's trajectory can be calculated and the ball's eventual path can be displayed on the screen. For simpler embodiments, the near-real-time fit can be determined by a linear fit of the two trajectory calculations from the first set of sensors 610 and second set of sensors 620. However, for a preferred embodiment, the near-real-time fit can be determined by a polynomial function that is fitted to the three (3) known points (e.g., tee 600, first set of sensors 610, and second set of sensors 620), and simulates the remaining ball path with the effect of ball speed, ball rotation, and drag. Some embodiments may employ higher-order polynomials or sine functions to determine the near-real-time fit of the ball's trajectory. Suffice it to say, the positional data can be used as input data for an algorithm to give the ball a starting trajectory, a starting velocity, and a starting rotation, as well as take into account how a golf ball flies through the air with drag, ball lift, and spin. In other embodiments, a simulation, as opposed to a curve fit, may be completed in near-real-time or right after the ball passes both sets of sensors. The simulation is then converted to an image displayed on the screen for the golfer to see. For preferred embodiments, the software can be developed using open-source or other commercially available software. This allows for a very streamlined and cost-effective system to measure a golf ball's trajectory after the golfer has hit the ball from the tee 600.

One can appreciate that it is within the scope of this disclosure that the disclosed trajectory-calculating system can be practiced in combination any of the aforementioned embodiments disclosing storage systems for baggage for a driving range. Although exemplary embodiments have been shown and described, it will be clear to those of ordinary skill in the art that a number of changes, modifications, or alterations to the disclosure as described may be made. For example, the bin may be made of plastic, metal, or any other suitable material. Additionally, the track and the bars used to couple the bin to the driving area can be made of metal, plastic or any other suitable material. The driving area can be any appropriate shape or size and have any type of artificial grass surface. The All such changes, modifications, and alterations should therefore be seen as within the scope of the disclosure.

What is claimed is:

1. A system comprising:
   a driving area having a golf tee; and
   a baggage storage bin coupled to the driving area, the baggage storage bin being located less than approximately two (2) meters from the golf tee.

2. The system of claim 1, the driving area being elevated above ground level.

3. The system of claim 1, the baggage storage bin being integrated with an underside of the driving area such that the baggage storage bin is less than approximately twenty-five (25) centimeters (cm) from the golf tee.

4. The system of claim 1, the baggage storage bin being located less than approximately one (1) meter from the golf tee.

5. The system of claim 1, the baggage storage bin being located less than approximately fifty (50) centimeters from the golf tee.

6. The system of claim 1, the baggage storage bin being located less than approximately twenty-five (25) centimeters from the golf tee.

* * * * *